J. S. CLARKE.
DEVICE FOR STRETCHING WIRES AND CABLES.
APPLICATION FILED JULY 15, 1912. RENEWED SEPT. 29, 1913.
1,094,979.
Patented Apr. 28, 1914.
2 SHEETS—SHEET 1.
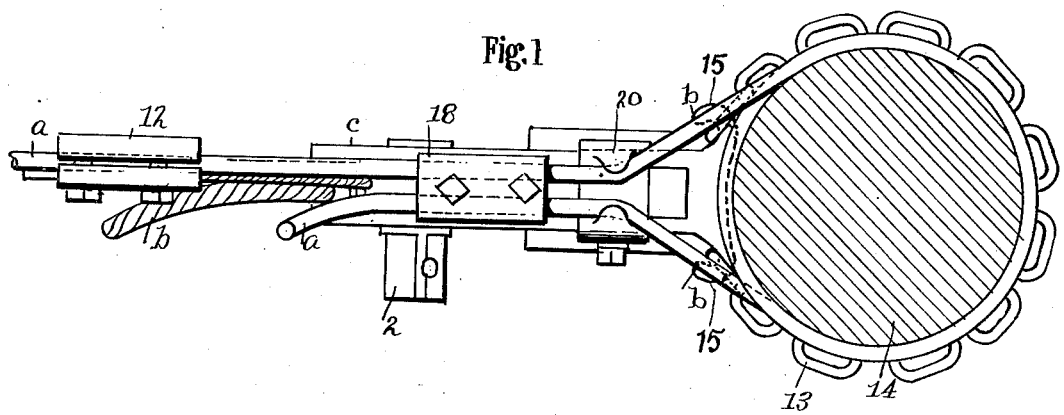
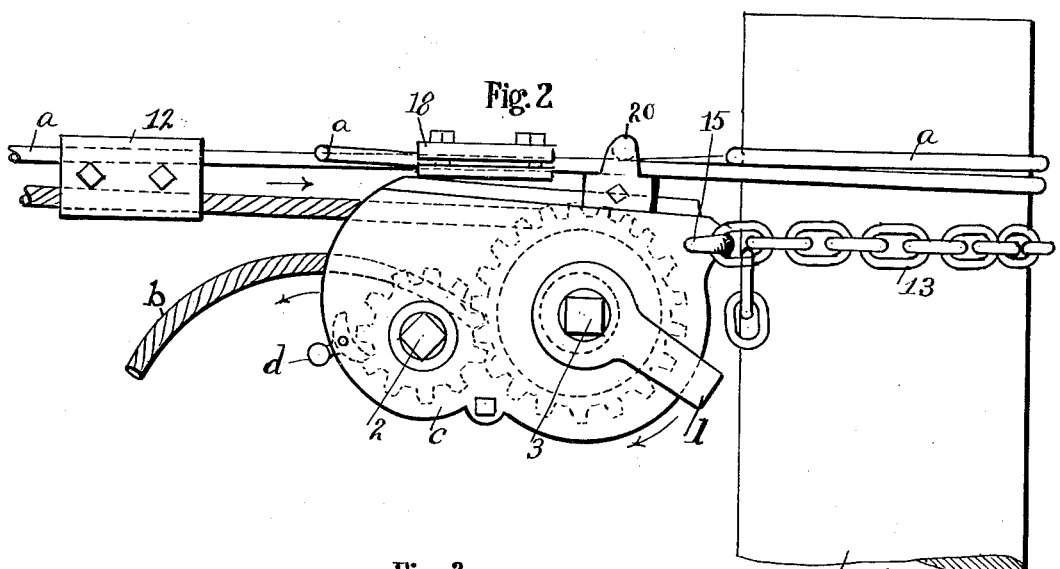
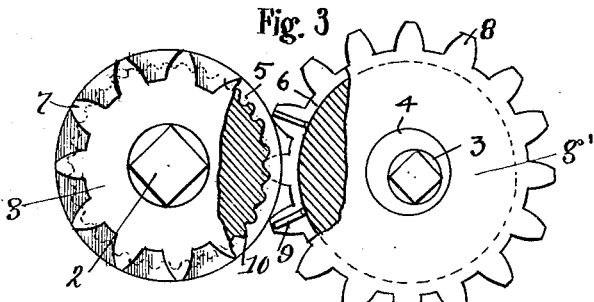
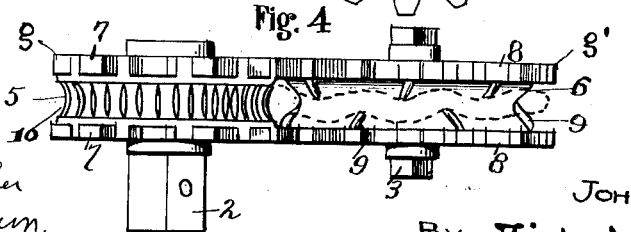
ATTEST
E. M. Fisher
J. C. Musson
INVENTOR.
JOHN S. CLARKE
BY Fisher Ullock ATTYS.

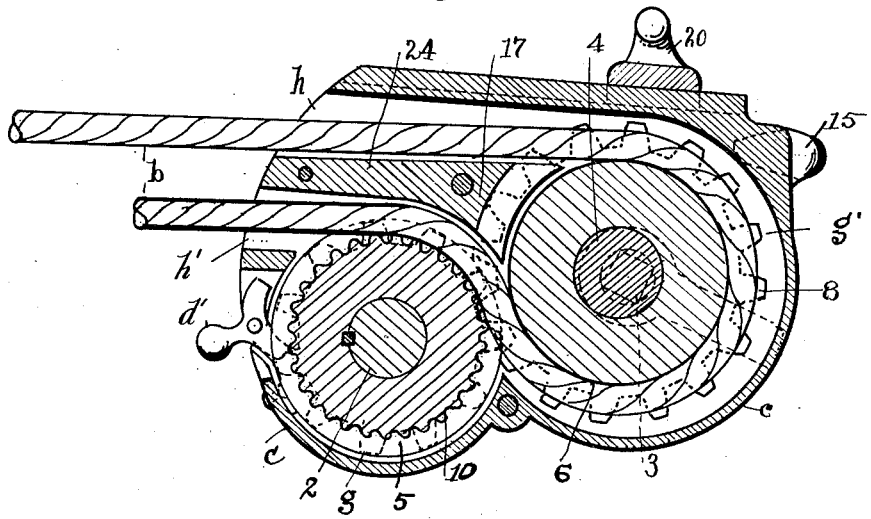
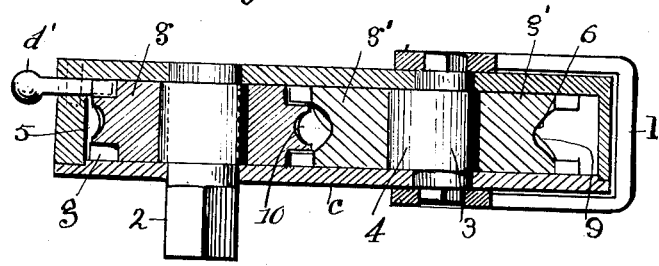
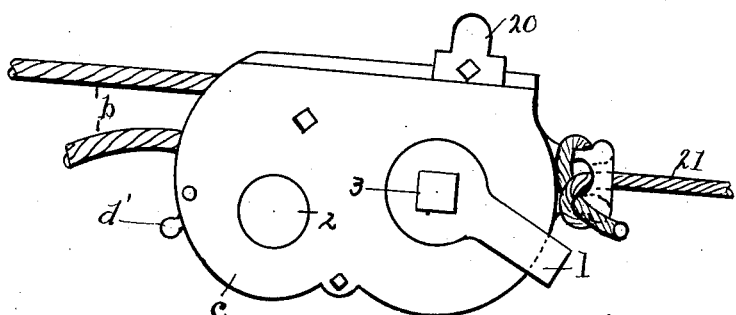

UNITED STATES PATENT OFFICE.

JOHN S. CLARKE, OF EAST CLEVELAND, OHIO, ASSIGNOR OF ONE-HALF TO T. D. LEMIEUX, OF CLEVELAND, OHIO.

DEVICE FOR STRETCHING WIRES AND CABLES.

1,094,979.      Specification of Letters Patent.      Patented Apr. 28, 1914.

Application filed July 15, 1912, Serial No. 709,608. Renewed September 29, 1913. Serial No. 792,484.

*To all whom it may concern:*

Be it known that I, JOHN S. CLARKE, citizen of the United States, residing at East Cleveland, in the county of Cuyahoga and State of Ohio, have invented certain new and useful Improvements in Devices for Stretching Wires and Cables, of which the following is a specification.

This invention relates to devices for stretching wires and cables, all substantially as shown and described and particularly pointed out in the claims.

In the accompanying drawings, Figure 1 is a plan view of the device, and Fig. 2 a side elevation thereof shown as engaged upon a pole or shaft. Fig. 3 is a side elevation of two tension gear wheels mounted within the casing as seen in dotted lines Fig. 2, and Fig. 4 is an edge view of said wheels shown in mesh. Fig. 5 is a sectional elevation of the said gear wheels and casing therefor. Fig. 6 is a sectional plan of Fig. 5 on the axes of the gear wheels. Fig. 7 is a side elevation of a modification showing a casing adapted to be connected with the pole or post by cable of rope or wire instead of chain.

The device as thus shown contemplates the stretching of heavy guy wires, cables and the like in structural and other work in which the weight of the wire or cable alone is often a difficult problem to deal with and there is consequent difficulty in getting the same stretched to the required tension and with all the slack taken up.

This invention therefore consists of a tightening mechanism for cables and the like having power appliances which are effectually controlled through a hand crank or its equivalent and which comprises a set of tension gears $g$ and $g'$, a suitable housing or casing $c$ in which said gears are mounted on shafts 2 and 3 respectively, and means to adjust the gears in relation to each other according to the size of the tension cable, wire or the like that is to pass between them for stretching purposes. For the purposes of such adjustment I provide the shaft 3 with an eccentric portion 4 rotatable in the wheel $g'$ by means of handle or lever $l$, which is adapted by rotation to move said wheel $g'$ nearer to or farther from the wheel $g$ but which always leaves their gear teeth 7 and 8 in mesh more or less. It is to be especially observed that these wheels are peculiar in several particulars and especially in having a channel 5 and 6 respectively in their periphery, which channels are substantially semi-circular in cross section and are between the teeth 7 and 8 respectively on both sides of said channels. Furthermore the channel 6 is made more or less sinuous or serpentine by means of radial ribs 9 on the inside of alternating teeth or cogs 8 at the two sides of the said channel. The wheel $g$ is peculiar in that it has a series of transverse ribs or corrugations 10 in the bottom of its annular groove 5 at suitable intervals apart and adapted to coöperate with the said ribs 9 in gripping the rope or cable $b$ and holding the same against slipping when stretching occurs. The said cable $b$ is auxiliary to the main cable or wire $a$ which is to be stretched and is referred to as the tension cable because its function is to stretch the main cable so that the same can be fastened when stretched and the tension device can be dispensed with. Clamps 12 serve to fix the tension cable $b$ upon the wire $a$ and thus make the desired temporary engagement preparatory to the fastening of the end of the main cable upon its own fixed support. To these ends also the housing or casing $c$ is anchored by chain 13 to the said support or pole 14 through hooks 15 on said casing, and the shaft 2 of gear $g$ has a square shank adapted to be engaged by a suitable hand crank, not shown.

In operation the tension wire $b$ is introduced through the upper opening $h$ in the edge of the casing, and passing thence around the wheel $g'$ along the correspondingly curved interior of the casing is deflected upward at the V-shaped deflector 17 between the two wheels and engaged as seen in Fig. 5 and out at the hole or opening $h'$. Finally, having stretched the cable $a$ as much as desired it is secured to the pole or post 14 after the manner shown in Figs. 1 and 2 or by equivalent means. As shown the said main cable, wire or rope $a$ is passed through a clamp 18 above the casing $c$ and thence between the horns of the guide or yoke 20 with two or more windings about post 14 and then back through said guide with the free end inserted in clamp 18. The said clamp is then tightened thereon and the cable $a$ is thus secured and the entire stretching device including the short tension cable $b$ can then be removed and employed elsewhere for a like purpose. Of course the clamp 18 is supposed to be constructed in such way as to effectually grip and hold the said wire or cable *a* regardless of the strain thereon and the said clamp becomes a fixed part for the cable.

By means of the yoke 20 with its comparatively close horns the cable or wire *a* is brought together where it approaches the clamp 18 and enables the cable to be engaged within the clamp with comparative ease, whereas without such means the said cable or wire, especially if fairly heavy and stiff was found difficult to cramp and bring within said clamp. The said yoke is detachably fixed on the top of casing *c* by any suitable means, and is also longitudinally adjustable thereon.

Practically both constructions of the said gears in their engaging portions 9 and 10 contribute to the complete gripping of the tension cable *b*, and the proximity of the said gears is designed to be such as to render their hold upon the said cable thoroughly effective between them. Such proximity depends upon the size of the cable, cord or wire used, and the wheel *g'* is adjustable in respect to wheel *g* by means of the cam shaft 3 and lever *l* as hereinbefore described.

In Fig. 7 I show a wire or rope 21 instead of a chain as in Figs. 1 and 2 for securing the casing to the pole or post 14.

It will be understood that the tightening device shown and described herein can be used for stretching guy ropes, wires for electric lights, telegraph and telephone poles, as well as for wires, cables or the like for hoists and smoke stacks.

It will be noticed that the intervening division wall 24 opposite the smaller wheel *g* extends back near to the larger wheel and serves as a guide for the cable or wire both as it is introduced through hole *h* and as it approaches the hole or opening *h'* after passing the smaller wheel, the projecting end 17 above serving to deflect the cable downward between the wheels as above described.

What I claim is:

1. A device for stretching wires and the like comprising a suitable casing and two intermeshing gears of different sizes mounted on suitable shafts therein and constructed on their peripheries to grip a wire between them, and an eccentric bearing for one of said gears adapted to govern the position thereof in respect to the other gear.

2. A device as described having a casing and intermeshing gears of different sizes therein having grooves in their peripheries and constructed in said grooves to grip a cable or wire between them, said casing having a guide way for the wire leading around the larger of said gears and back and out over the smaller gear, a pawl to engage one of said gears and prevent backward rotation, and shafts carrying said gears, one of which is constructed to engage a crank therewith to rotate the same.

3. A casing as described and a pair of intermeshing wheels of different sizes therein, one of said wheels having a shank extending to the outside of said casing adapted to rotate the same, and said casing having two different openings in its edge into the interior about said wheels and a division wall between said holes extending past the smaller wheel to the larger one and forming part of a curved guide way for a cable.

In testimony whereof I affix my signature in presence of two witnesses.

JOHN S. CLARKE.

Witnesses:
H. T. FISHER,
F. C. MUSSUN.